United States Patent
Xu

(10) Patent No.: US 9,760,466 B2
(45) Date of Patent: Sep. 12, 2017

(54) TOUCH-CONTROL MONITORING METHOD FOR TOUCHSCREEN AND TERMINAL

(71) Applicant: DONGGUAN GOLDEX COMMUNICATION TECHNOLOGY CO., LTD., Guangdong (CN)

(72) Inventor: Wen Xu, Dongguan (CN)

(73) Assignee: DONGGUAN GOLDEX COMMUNICATION TECHNOLOGY CO., LTD., Dongguan (CN)

( * ) Notice: Subject to any disclaimer, the term of this patent is extended or adjusted under 35 U.S.C. 154(b) by 111 days.

(21) Appl. No.: 14/381,892

(22) PCT Filed: Oct. 23, 2013

(86) PCT No.: PCT/CN2013/085783
§ 371 (c)(1),
(2) Date: Aug. 28, 2014

(87) PCT Pub. No.: WO2014/153953
PCT Pub. Date: Oct. 2, 2014

(65) Prior Publication Data
US 2016/0202824 A1    Jul. 14, 2016

(30) Foreign Application Priority Data
Mar. 26, 2013    (CN) .......................... 2013 1 0100953

(51) Int. Cl.
G06F 3/045        (2006.01)
G06F 11/34        (2006.01)
(Continued)

(52) U.S. Cl.
CPC .......... *G06F 11/3438* (2013.01); *G06F 3/044* (2013.01); *G06F 3/0416* (2013.01); *G06F 11/3041* (2013.01); *G06F 2203/04104* (2013.01)

(58) Field of Classification Search
CPC . G06F 2203/04107; G06F 2203/04111; G06F 2203/04112; G06F 2203/04113;
(Continued)

(56) References Cited

U.S. PATENT DOCUMENTS

2008/0084389 A1*  4/2008  Mac .................... H04N 5/4403
                                                    345/158
2012/0278031 A1*  11/2012 Oda ..................... G06F 3/0416
                                                    702/150

* cited by examiner

*Primary Examiner* — Kumar Patel
*Assistant Examiner* — Insa Sadio
(74) *Attorney, Agent, or Firm* — Shimokaji IP

(57) ABSTRACT

Embodiments of the present invention disclose a touch-control monitoring method for a touchscreen, and a terminal. The method includes: acquiring a touch-control operation that is performed by a user in a preset touch-control area on a touchscreen; recording the number of the touch-control operations that are acquired in the preset touch-control area; and marking corresponding touch-control status in the preset touch-control area according to the recorded number of the touch-control operations that are acquired in the preset touch-control area. By using the present invention, the usage of a touchscreen may be monitored, and different touch-control status is marked on the touchscreen according to the number of the touch-control operations performed by a user on the touchscreen, so as to prompt the user the corresponding touch-control conditions on the touchscreen.

8 Claims, 2 Drawing Sheets

(51) Int. Cl.
*G06F 3/044* (2006.01)
*G06F 3/041* (2006.01)
*G06F 11/30* (2006.01)

(58) Field of Classification Search
CPC ....... G06F 3/044; G06F 3/045; H05K 1/0287; H05K 1/0289; H05K 1/0296; H05K 1/092; H05K 9/0047
See application file for complete search history.

TOUCH-CONTROL MONITORING METHOD FOR TOUCHSCREEN AND TERMINAL

CROSS-REFERENCE TO RELATED APPLICATIONS

This application claims priority to the Chinese Patent Application No. 201310100953.0, filed with the Chinese Patent Office on Mar. 26, 2013, and entitled "TOUCH-CONTROL MONITORING METHOD FOR TOUCHSCREEN AND TERMINAL", which is incorporated herein by reference in its entirety for all purposes.

TECHNICAL FIELD

The present invention relates to the field of electronics technologies, and in particular, to a touch-control monitoring method for a touchscreen and a terminal.

BACKGROUND

With the increasing development of smartphones, operations of a mobile terminal are increasingly diversified, and increasingly show human-machine interaction. Smartphone with a large touchscreen has become a developing tendency of mobile phone. Touchscreen mobile phone is characterized by a friendly human-machine interface, smooth operating performance, single-point touch-control or multi-point touch-control, diversified interface manners, and the like. The touchscreen of a mobile terminal mainly includes a resistive touchscreen and a capacitive touchscreen. For the resistive touchscreen, pressure is required to enable all layers of the screen to come into contact with each other, and a finger, a fingernail, a touchpen or the like may be used for operation. For the capacitive touchscreen, a capacitive sensing system below the touchscreen can be activated by even a slight contact of an electron-rich finger surface on the screen, but if a non-living object which is not a conductor, such as a finger-nail or a glove, is used to slightly touch the screen, the touch is invalid. In the process of using a touchscreen mobile phone, if a user touches a certain area on a touchscreen for a long time when operating the touchscreen mobile phone, a service life of the touchscreen in the area is shortened, and then the touchscreen may be frequently replaced, which is unbeneficial to the protection for a touchscreen of a mobile phone.

SUMMARY

Embodiments of the present invention provide a touch-control monitoring method for a touchscreen, and a terminal, which may monitor the usage of the touchscreen, and mark different touch-control status on the touchscreen according to the number of touch-control operations that are performed by a user on the touchscreen, so as to prompt the user the corresponding touch-control conditions on the touchscreen.

An embodiment of the present invention provides a touch-control monitoring method for a touchscreen, including:

acquiring a touch-control operation that is performed by a user in a preset touch-control area on a touchscreen;

recording the number of the touch-control operations that are acquired in the preset touch-control area; and marking corresponding touch-control status in the preset touch-control area according to the recorded number of the touch-control operations that are acquired in the preset touch-control area.

Correspondingly, an embodiment of the present invention further provides a terminal, including:

a touch-control area acquiring module, configured to acquire a touch-control operation that is performed by a user in a preset touch-control area on a touchscreen;

a touch-control number recording module, configured to record the number of the touch-control operations that are acquired in the preset touch-control area; and a touch-control status identification module, configured to mark, according to the number of the touch-control operations that are acquired in the preset touch-control area, a corresponding touch-control status in the preset touch-control area.

By implementing the embodiments of the present invention, the usage of a touchscreen may be monitored, and different touch-control status is marked on the touchscreen according to the number of the touch-control operations that are performed by a user on the touchscreen, so as to prompt the user corresponding touch-control conditions in all touch-control areas on the touchscreen.

BRIEF DESCRIPTION OF DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
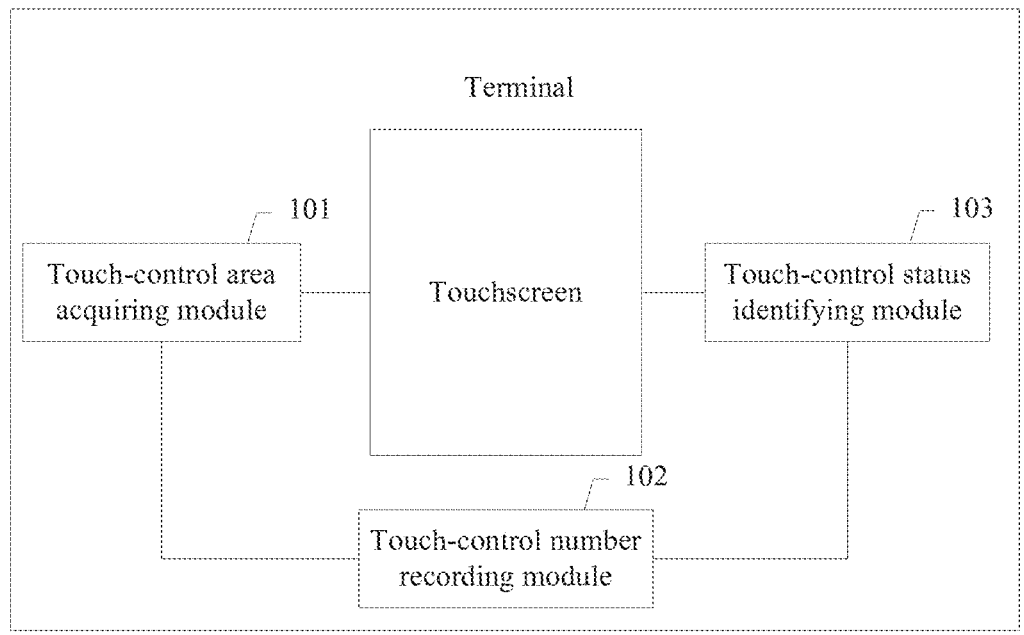
FIG. 1 is a schematic structural diagram of a terminal according to an embodiment of the present invention.

FIG. 1 is a schematic structural diagram of a terminal according to an embodiment of the present invention. The terminal according to the embodiment of the present invention may be, but not limited to: a mobile phone, a tablet computer, a Personal Digital Assistant (PDA, also called palm computer), or a touchscreen media player. Currently, a mobile phone is taken here as an example for specific description. As shown in the figure, the terminal of the embodiment at least includes a touch-control area acquiring module 101, a touch-control number recording module 102, and a touch-control status identification module 103. One port of the touch-control area acquiring module 101 is connected to a touchscreen of the terminal, another port of the touch-control area acquiring module 101 is connected to the touch-control number recording module 102; one port of the touch-control status identification module 103 is connected to the touch-control number recording module 102, and another port of the touch-control status identification module 103 is connected to the touchscreen of the terminal.

The touch-control area acquiring module 101 is configured to acquire a touch-control operation that is performed by a user in a preset touch-control area on the touchscreen. During specific implementation, the preset touch-control area may be subareas obtained by dividing the touchscreen in advance, and each subarea includes a plurality of touch-control points. The preset touch-control area may also be a specific touch-control point, for example, the preset touch-control areas may be four areas obtained by uniformly dividing the touchscreen, the four areas are: an upper left area, a lower left area, an upper right area and a lower right area, and one of the preset touch-control areas may be a touch-control point A (X, Y). The touch-control operation that is performed by a user on a touchscreen may be: clicking, sliding, long-pressing or other touch-control operations, which are performed by the user on the touchscreen of the mobile phone. The mobile terminal can identify that the touch-control operation is performed by a user in which the preset touch-control area on the touchscreen, and then the touch-control area acquiring module 101 acquires the touch-control operation that is performed by the user in the preset touch-control area on the touchscreen. Further, the mobile terminal can identify a touch-control position of the touch-control operation. A touchscreen of the mobile terminal mainly has two types: namely, a resistive touchscreen and a capacitive touchscreen. The resistive touchscreen performs the touch-control operation by using pressure induction. Main parts of the resistive touchscreen include two conductive layers. When the resistive touchscreen is touched by a finger of the user, the two conductive layers contact with each other in a position of a touch-control point, so that the resistance of the conductive layers changes correspondingly, and signals are generated on the conductive layers in two directions, namely, X and Y directions; and the signals are sent to a controller of the touchscreen, so that the controller of the touchscreen detects the touch-control operation and calculates the position (X, Y) of the touch-control point. The capacitive touchscreen works by using current induction of a human body, that is, when the capacitive touchscreen is touched by a finger of the user, coupling capacitance is formed between the user and a surface of the touchscreen due to an electrical field of the human body; for the high-frequency current, a capacitor is a conductor, so that the finger can conduct a very small current from the touch-control point, and the current separately flow out from electrodes on four corners of the touchscreen. The values of the current flowing through the electrodes are in direct proportion to the distances between the finger and the four corners; and the controller obtains the position of the touch-control point by accurately calculating proportions of the four currents.

The touch-control number recording module 102 is configured to record the number of the touch-control operations that are acquired in the preset touch-control area. During specific implementation, the touch-control number recording module 102 records the number of the touch-control operations that are obtained in the preset touch-control area; and if there are a plurality of touch-control points in the preset touch-control area, then the number of the touch-control operations corresponding to all the touch-control points in the preset touch-control area is recorded. Further, the number of the touch-control operations, recorded by the touch-control number recording module 102, that are acquired in the preset touch-control area can be: the number of the touch-control operations corresponding to different preset touch-control areas that are recorded within a preset time, that is, recording the number of the touch-control operations that correspond to different preset touch-control areas within a preset time. The preset time is an editable time segment, such as 30 minutes, 12 hours, or 10 days. The number of the touch-control operations that correspond to the different preset touch-control areas is recorded within the preset time, that is, the number of each touch-control position which is touched in the different preset touch-control areas is recorded. For example, the number of a touch-control point A that is touched within 12 hours is 28, the number of a control-control position B that is touched within 12 hours is 75, and the number of a touch-control position C that is touched within 12 hours is 0.

Figure 2:
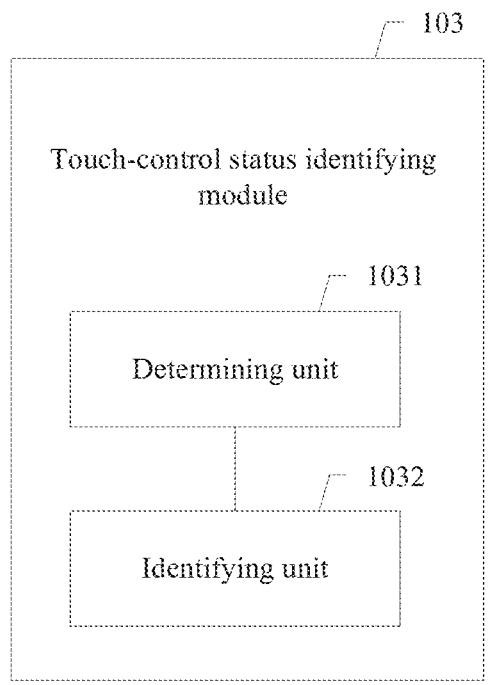
FIG. 2 is a schematic structural diagram of a touch-control status identification module of a terminal according to an embodiment of the present invention.

The touch-control status identification module 103 is configured to mark, according to the number of the touch-control operations that are acquired in the preset touch-control area, a corresponding touch-control status in the preset touch-control area. During specific implementation, FIG. 2 is a schematic structural diagram of a touch-control status identification module of a terminal according to an embodiment of the present invention. As shown in FIG. 2, the touch-control status identification module 103 at least includes: a determining unit 1031 and an identifying unit 1032, wherein, the determining unit 1031 is configured to determine whether the number of the touch-control operations that are acquired in the preset touch-control area meets a preset threshold of the number of the touch-control operations; the identifying unit 1032 is configured to, when the determining unit 1031 determines that the number of the touch-control operations that are acquired in the preset touch-control area meets the preset threshold of the number of the touch-control operations, mark the corresponding touch-control status in the preset touch-control area according to the preset threshold of the number of the touch-control operations.

Further, the preset threshold of the number of the touch-control operations at least optionally includes: N number segments, where N is an integer greater than 1; and the preset threshold of the number of the touch-control operations may be a specific editable number segment, for example, a first number segment: 0-30, a second number segment: 31-60, a third number segment: 61-90, a fourth number segment: 91-120. The touch-control status at least includes: N touch-control status, where N is an integer greater than 1. Further, the corresponding touch-control status, marked by the identifying unit 1032, in the preset touch-control area according to the preset threshold of the number of touch-control operations may optionally be: marking an $n^{th}$ touch-control status in the preset touch-control area if the preset threshold of the number of touch-control operations is the $n^{th}$ number segment, where n is a positive integer not greater than N. For example, a first touch-control status is marked in the preset touch-control area if the preset threshold of the number of the touch-control operations is the first number segment, a second touch-control status is marked in the preset touch-control area if the preset threshold of the number of the touch-control operations is the second number segment, and a third touch-control status is marked in the preset touch-control area if the preset threshold of the number of the touch-control operations is the third number segment.

Further, the touch-control status can be optionally in one-to-one correspondence with a preset color, where the first touch-control status corresponds to a first preset color, the second touch-control status corresponds to a second preset color, and the $n^{th}$ touch-control status corresponds to an $n^{th}$ preset color. The preset colors can be editable colors, such as red, green, orange, blue, or gradient red and green, wherein, the first touch-control status corresponds to the first preset color, namely green; the second touch-control status corresponds to the second preset color, namely blue; and the third touch-control status corresponds to a third preset color, namely orange, and so on.

Figure 3:
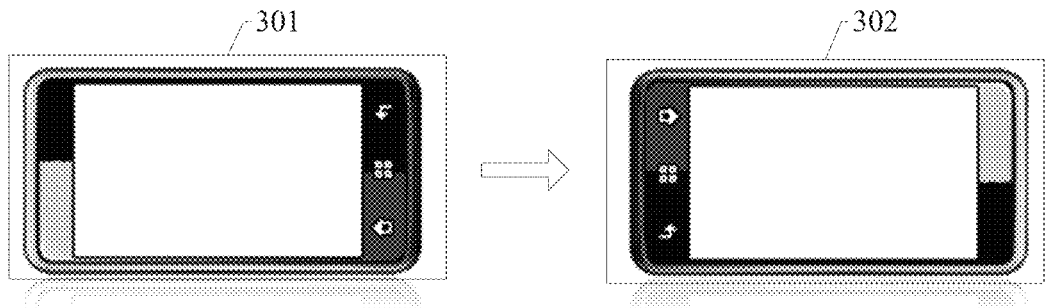
FIG. 3 is an operation prompting information effect figure of a touch-control monitoring method for a touchscreen according to an embodiment of the present invention.

Further, the touch-control status identification module 103 is further optionally configured to, according to marked touch-control status, display touchscreen operation prompting information on the touchscreen. Specifically, the touchscreen operation prompting information may be an effect figure corresponding to a specific touchscreen operation. FIG. 3 is an effect figure corresponding to the touchscreen operation prompting information of a touch-control monitoring method for a touchscreen according to an embodiment of the present invention. As shown in FIG. 3, 301 is a schematic diagram of a normal operation that is performed when a current user operates the mobile phone, and 301 may show that: because a user frequently operates a right area of the mobile phone due to a habit of using a right hand, a touch-control status in the right area is marked as red, and a touch-control status in a left area is marked as green; and 302 is a schematic diagram of a touchscreen operation that is suggested to the user according to a displayed touch-control status, which prompts, when a current mobile phone is overturned 180 degrees in a plane, that the user may perform an operation as shown in 302 when performing a touch-control operation on a touchscreen.

The embodiment of the present invention provides a terminal. The terminal may monitor the usage of a touchscreen and mark different touch-control status on the touchscreen according to the number of touch-control operations performed by a user on the touchscreen, so as to prompt the user touch-control conditions of each touch-control areas in the touchscreen, which is helpful for the users to perform a corresponding improvement operation for the touchscreen according to marked touch-control status, thereby prolonging a service life of a touchscreen.

The following describes specific implementations of a touch-control monitoring method for a touchscreen according to an embodiment of the present invention.

Figure 4:
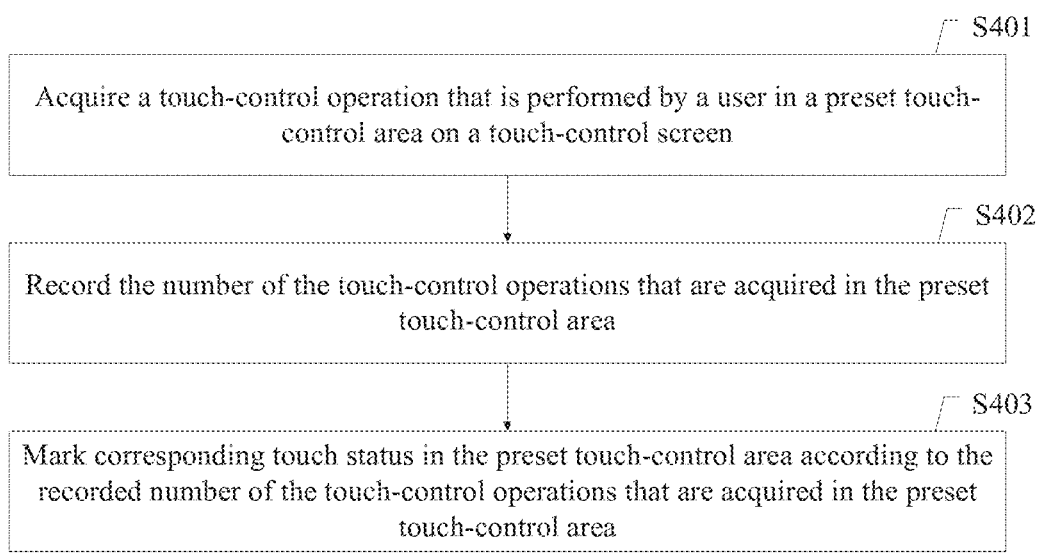
FIG. 4 is a flowchart of a touch-control monitoring method for a touchscreen according to an embodiment of the present invention.

FIG. 4 is a flowchart of a touch-control monitoring method for a touchscreen according to an embodiment of the present invention. The present invention may be implemented on a terminal, such as a mobile phone, a PDA, a tablet computer or a touchscreen media player. Currently, a mobile phone is used here as an example for specific description. As shown in the figure, a touch-control monitoring method for a touchscreen at least includes:

S401, acquiring a touch-control operation that is performed by a user in a preset touch-control area on the touchscreen. During specific implementation, the preset touch-control area may be subareas obtained by dividing the touchscreen in advance, and each subarea includes a plurality of touch-control points. The preset touch-control area may also be a specific touch-control point, for example, the preset touch-control areas may be four areas obtained by uniformly dividing the touchscreen, the four areas are: an upper left area, a lower left area, an upper right area and a lower right area, and one of the preset touch-control areas may be a touch-control point A (X, Y). The touch-control operation that is performed by a user on a touchscreen may be: clicking, sliding, long-pressing or other touch-control operations, which are performed by the user on the touchscreen of the mobile phone. The mobile terminal can identify that the touch-control operation is performed by a user in which the preset touch-control area on the touchscreen; and then, the touch-control operation that is performed by the user in the preset touch-control area on the touchscreen is acquired. Further, the mobile terminal can identify a touch-control position of the touch-control operation. A touchscreen of the mobile terminal mainly has two types, namely, a resistive touchscreen and a capacitive touchscreen. The resistive touchscreen performs the touch-control operation by using pressure induction. Main parts of the resistive touchscreen include two conductive layers; when the resistive touchscreen is touched by a finger of the user, the two conductive layers are in contact with each other in a position of a touch-control point, so that the resistance of the conductive layers changes correspondingly, and signals are generated on the conductive layers in two directions, namely, X and Y directions; and the signals are sent to a controller of the touchscreen, so that the controller of the touchscreen detects the touch-control operation and calculates the position (X, Y) of the touch-control point. The capacitive touchscreen works by using current induction of a human body, that is, when the capacitive touchscreen is touched by a finger of the user, coupling capacitance is formed between the user and a surface of the touchscreen due to an electrical field of the human body; for the high-frequency current, a capacitor is a conductor, so that the finger can conduct a very small current from the touch-control point, and the current separately flow out from electrodes on four corners of the touchscreen. The values of the current flowing through the electrodes are in direct proportion to the distances between the finger and the four corners; and the controller obtains the position of the touch-control point by accurately calculating proportions of the four currents.

S402, recording the number of the touch-control operations that are acquired in the preset touch-control area. During the specific implementation, the number of the touch-control operations that are acquired in the preset touch-control area is recorded; and if there is plurality of touch-control points in the preset touch-control area, then the number of the touch-control operations corresponding to all the touch-control points in the preset touch-control area is recorded. Further, the number of the touch-control operations that are acquired in the preset touch-control area can optionally be: the number of the touch-control operations corresponding to different preset touch-control areas that are recorded within a preset time, that is, recording the number of the touch-control operations that correspond to different preset touch-control areas within a preset time. The preset time is an editable time segment, such as 30 minutes, 12 hours or 10 days. The number of the touch-control operations that correspond to the different preset touch-control areas is recorded within the preset time, that is, the number of each touch-control position which is touched in the different preset touch-control areas is recorded. For example, the number of a touch-control point A that is touched within 12 hours is 28, the number of a touch-control position B that is touched within 12 hours is 75, and the number of a touch-control position C that is touched within 12 hours is 0.

S403, marking corresponding touch-control status in the preset touch-control area according to the number of the touch-control operations that are acquired in the preset touch-control area. During implementation, the step of marking corresponding touch-control status in the preset touch-control area according to the number of the touch-control operations that are acquired in the preset touch-control area, may include:

determining whether the number of the touch-control operations that are acquired in the preset touch-control area meets a preset threshold of the number of touch-control operations; and if the number of the touch-control operations that are acquired in the preset touch-control area meets the preset threshold of the number of the touch-control operations, marking the corresponding touch-control status in the preset touch area according to the preset threshold of the number of the touch-control operations.

Further, the preset threshold of the number of the touch-control operations at least optionally includes: N number segments, where N is an integer greater than 1; and the preset threshold of the number of the touch-control operations may be a specific editable number segment, for example, a first number segment: 0-30, a second number segment: 31-60, a third number segment: 61-90, a fourth number segment: 91-120. The touch-control status at least includes: N touch-control status, wherein, N is an integer greater than 1. Further, the corresponding touch-control status marked by the identifying unit in the preset touch-control area according to the preset threshold of the number of touch-control operations may optionally be: marking an $n^{th}$ touch-control status in the preset touch-control area if the preset threshold of the number of touch-control operations is the $n^{th}$ number segment, where n is a positive integer not greater than N. For example, a first touch-control status is marked in the preset touch-control area if the preset threshold of the number of the touch-control operations is the first number segment, a second touch-control status is marked in the preset touch-control area if the preset threshold of the number of the touch-control operations is the second number segment, and a third touch-control status is marked in the preset touch-control area if the preset threshold of the number of the touch-control operations is the third number segment.

Further, the touch-control status can be optionally in one-to-one correspondence with a preset color, where the first touch-control status corresponds to a first preset color, the second touch-control status corresponds to the second preset color, and the $n^{th}$ touch-control status corresponds to an $n^{th}$ preset color. The preset colors can be an editable color, such as red, green, orange, or blue, wherein, the first touch-control status corresponds to the first preset color, namely green; the second touch-control status corresponds to the second preset color, namely blue; and the third touch-control status corresponds to a third preset color, namely orange, and so on.

Further, touchscreen operation prompting information may be further optionally displayed on the touchscreen according to marked touch-control status. Specifically, the touchscreen operation prompting information may be an effect figure corresponding to a specific touchscreen operation. As shown in FIG. 3, 301 is a schematic diagram of a normal operation that is performed when a current user operates the mobile phone, and 301 may show that: because a user frequently operates a right area of the mobile phone due to a habit of using a right hand, a touch-control status in the right area is marked as red, and a touch-control status in a left area is marked as green; and 302 is a schematic diagram of a touchscreen operation that is suggested to the user according to a displayed touch-control status, which prompts, when a current mobile phone is overturned 180 degrees in a plane, that the user may perform an operation as shown in 302 when performing a touch-control operation on a touchscreen. Further, the touch-control operation prompting information may also be: touchscreen operation suggestion language information, touchscreen operation suggestion text information, or the like.

The embodiment of the present invention provides a touch-control monitoring method for a touchscreen. Different touch-control status is marked on the touchscreen according to the number of touch-control operations performed by a user on the touchscreen, so as to prompt the user touch-control conditions of each touch-control areas in the touchscreen, which is helpful for the users to perform a corresponding improvement operation for the touchscreen according to marked touch-control status, thereby prolonging a service life of a touchscreen.

The modules or units in the embodiments of the present invention may be implemented by using a general integrate circuit, such as a CPU (Central Processing Unit), or by using an ASIC (Application Specific Integrated Circuit).

The steps in the method provided in the embodiment of the present invention can be subject to sequence regulation, integration and deletion according to an actual need.

The modules or units in the apparatus provided in the embodiment of the present invention can be integrated, divided and deleted according to an actual need.

It should be noted that through the description in the foregoing embodiments, a person skilled in the art are clearly aware that the present invention may be implemented through software in addition to a necessary hardware platform, or all through hardware. Based on such understanding, all or a part of the technical solutions of the present invention contributing to the prior art may be implemented in a form of a software product. The computer software product may be stored in a storage medium such as a ROM/RAM, a magnetic disk, or an optical disc, and includes several instructions for instructing a computer device (which may be a personal computer, a server, a network device, or the like) to execute the method described in all or a part of the embodiments of the present invention.

The foregoing embodiments are merely exemplary embodiments of the present invention and are not intended to limit the scope of the claims of the present invention. Any equivalent variance made according to the claims of the present invention shall fall within the scope of the present invention.

What is claimed is:

1. A touch-control monitoring method for a touchscreen, comprising:

acquiring a touch-control operation that is performed by a user in a preset touch-control area on a touchscreen;

recording the number of the touch-control operations that are acquired in the preset touch-control area; and marking corresponding touch-control status in the preset touch-control area according to the number of the touch-control operations that are acquired in the preset touch-control area, comprising:

determining whether the number of the touch-control operations that are acquired in the preset touch-control area meets a preset threshold of the number of the touch-control operations; and if the number of the touch-control operations that are acquired in the preset touch-control area meets the preset threshold of the number of the touch-control operations, marking the corresponding touch-control status in the preset touch-control area according to the preset threshold of the number of the touch-control operations.

2. The method according to claim 1, wherein the recording the number of the touch-control operations that are acquired in the preset touch-control area, comprises:
recording the number of the touch-control operations that correspond to different preset touch-control areas within a preset time.

3. The method according to claim 1, wherein the preset threshold of the number of the touch-control operations at least comprises; N number segments; the touch-control status at least comprises: N touch-control status; and the marking corresponding touch-control status in the preset touch-control area according to the preset threshold of the number of the touch-control operations is: marking an nh touch-control status in the preset touch-control area if the preset threshold of the number of the touch-control operations is the nh number segment, wherein n is a positive integer not greater than N.

4. The method according to claim 3, wherein the touch-control status is in one-to-one correspondence with a preset color, the first touch-control status corresponds to a first preset color, the second touch-control status corresponds to the second preset color, and the $n^{th}$ touch-control status corresponds to the $n^{th}$ preset color.

5. A terminal, comprising:
a memory storing a plurality of program codes; and
a processor configured to execute the plurality of program codes for:
acquiring a touch-control operation that is performed by a user in a preset touch-control area on a touchscreen;
recording the number of the touch-control operations that are acquired in the preset touch-control area; and
marking, according to the number of the touch-control operations that are acquired in the preset touch-control area, a corresponding touch-control status in the preset touch-control area, comprising:
determining whether the number of the touch-control operations that are acquired in the preset touch-control area meets a preset threshold of the number of the touch-control operations; and
when determining that the number of the touch-control operations that are acquired in the preset touch-control area meets the preset threshold of the number of the touch-control operations, marking the corresponding touch-control status in the preset touch-control area according to the preset threshold of the number of the touch-control operations.

6. The terminal according to claim 5, wherein that recording the number of the touch-control operations that are acquired in the preset touch-control area, comprises:
recording the number of the touch-control operations that correspond to different preset touch-control areas within a preset time.

7. The terminal according to claim 5, wherein the preset threshold of the number of the touch-control operations at least comprises: N number segments; the touch-control status at least comprises: N touch-control status; and that marking the corresponding touch-control status in the preset touch-control area according to the preset threshold of the number of the touch-control operations is: marking an nh touch-control status in the preset touch-control area if the preset threshold of the number of the touch-control operations is the nh number segment, where n is a positive integer not greater than N.

8. The terminal according to claim 7, wherein the touch-control status is in one-to-one correspondence with a preset color, the first touch-control status corresponds to the first preset color, the second touch-control status corresponds to the second preset color, and the $n^{th}$ touch-control status corresponds to an $n^{th}$ preset color.

* * * * *